United States Patent [19]

Ormbsy

[11] Patent Number: 4,500,433

[45] Date of Patent: Feb. 19, 1985

[54] METHOD OF REMOVING SALTS OF THE ALKALI EARTH METAL GROUP FROM WATER

[76] Inventor: Lee S. Ormbsy, 1185 Naragansett Blvd., Suite 305, Cranston, R.I. 02905

[21] Appl. No.: 570,549

[22] Filed: Jan. 13, 1984

[51] Int. Cl.³ .............................................. C02F 9/00
[52] U.S. Cl. .................................................... 210/669
[58] Field of Search .............. 210/669, 266, 284, 340, 210/687

[56] References Cited

U.S. PATENT DOCUMENTS 3,056,499 10/1962 Liddell ................................ 210/340
4,049,548 9/1977 Dickerson .......................... 210/340
4,196,081 4/1980 Pavia .................................. 210/284

*Primary Examiner*—Ivars Cintins
*Attorney, Agent, or Firm*—Barlow & Barlow Ltd.

[57] ABSTRACT

A method of removing salts of the alkali earth metal group from water is provided wherein water is supplied at a controlled flow to a pair of serially connected five-micron prefilters which remove contaminants and reduce the flow rate. The effluent is then passed through at least twelve parallel connected activated charcoal filter units where the flow is reduced to approximately 0.5 g.p.m. allowing additional time for the alkali salt to be adsorbed in the charcoal.

2 Claims, 1 Drawing Figure

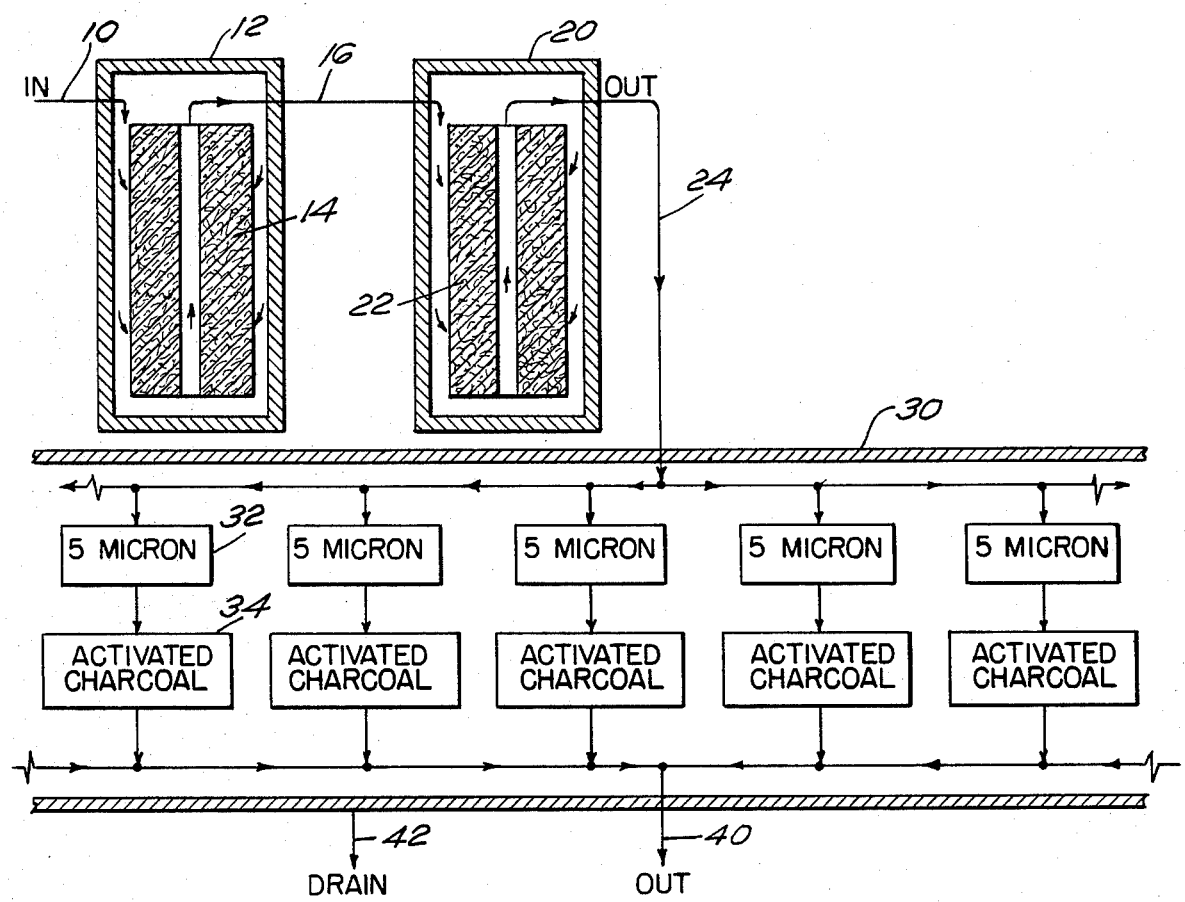

METHOD OF REMOVING SALTS OF THE ALKALI EARTH METAL GROUP FROM WATER

This invention relates to a method for removing salts of the alkali earth metal group from water. In general potable water is extracted either from surface supply, such as lakes and rivers or from ground water. Many of the public water supplies are taken from ground water which generally is in place for a long time. For this reason, contaminants can remain present at high concentrations long after entering the ground water. A still further characteristic of ground water is that this liquid is actually contained within rock and possibly sediments, and therefore receives considerable filtration. This filtration effectively eliminates biological hazards, but it is far less successful at stopping toxic chemicals.

Methods are availabe for removing many pollutants from drinking water, for example, aeration, granulated activated carbon, and reverse osmosis, are all techniques currently recognized by the EPA. To be effective against some of the chemicals currently listed as being either toxic or carcinogenic it has been discovered that properly used, high-quality treatment systems offer some protection against toxic chemicals in drinking water; but to be effective against even the treatable pollutants, the treatment system must not be overloaded. For example, it has been discovered that granulated activated carbon requires at least a half hour of contact to be effective against some chemicals.

It is an object of the present invention to provide a new and improved method for treating potable water that is safe and reduces the presence of alkali earth metals.

A secondary object is to provide a more effective, efficient and cost effective method without the need for expensive capital equipment for the user.

According to the present invention, I provide a method of removing salts of the alkali earth metal group by reducing the flow rate into a filter bed and inserting at least two five-micron filters ahead of the main filter bed that is made up of granulated activated carbon.

DETAILED DESCRIPTION OF THE DRAWINGS

In the drawings the single FIGURE is a schematic diagram of a filtering system arranged in accordance with the invention.

DESCRIPTION OF THE PREFERRED EMBODIMENT

In proceeding with the invention, reference should be had to the accompanying drawing which illustrates a preferred arrangement. The first step in proceeding with the invention is to reduce the flow rate of the water and utilize an inlet pipe 10 no grant than a half inch in diameter. When this is done, the maximum flow rate through a half-inch pipe at 75 lbs. psi will be on the order of 7.5 gallons per minute. The water is then introduced into a water filter housing 12 which contains a five-micron cartridge 14. The cartridge will be of conventional white cellulose cartridge designed for cold water service; and its insertion into the line will now reduce the flow rate on the discharge piping 16 which will also be preferably of a half-inch size, to something on the order of four to five gallons per minute. In many cases it is desirable to insert a second pre-filter as seen by the housing 20 which will contain a five-micron cartridge 22 that will again reduce the flow rate and remove additional particles such as solid particles that may be characterized as sand, silt, dirt and rust, for example. The flow rate now at the outlet piping 24 has now been reduced to approximately three gallons per minute, and this is fed into a large filter casing diagramatically designated 30, into which are located a plurality of parallel connected five-micron cellulose filters 32, located just ahead of granulated activated carbon cartridges 34. The five-micron cartridge 32 and the charcoal cartridge 34 may be combined in a single cartridge for ease in installation.

In its preferred form within the casing 30 there should be located at least twelve charcoal and five-micron pre-filters, it being recognized that purely by way of illustration, only five are shown. By utilizing this quantity of units, the flow rate at the output pipe 40 has been effectively slowed down to approximately 0.5 gallons per minute, which guarantees longer contact of the water with the granulated activated carbon, which has been labeled "activated charcoal" in the drawing. For convenience sake, the container 30 will also be provided with a drain 42 so that any precipitated contaminants can be drawn off from time to time when actual replacement of the complete cartridges therein is necessary.

The granular activated charcoal used in the cartridges 34 is generally processed in a multiple hearth furnace at a temperature of 1750° F., into which steam is introduced so that the organic impurities are oxidized and devolatilized. This process creates an enormous surface area that is produced by the many cracks and crevices so that the charcoal looks somewhat like a natural sponge. This yields a large surface area which atracts and traps the contaminants in the water as the water is passed therethrough. As the water flows through the charcoal, chemicals are adsorbed by the activated charcoal. In addition, it is believed that the salts of the alkali earth metals are precipitated, since it is believed that by slowing the water flow through the micron filtering, a loss kinetic energy attracts the cations of, for example, sodium, and the anions of chloride and are rejoined to form a larger mass that precipitates out of the fluid.

A number of tests have been conducted that show conclusively that indeed the alkali earth metal cations are significantly reduced, and the data is shown herein, Table I indicating the reduction of the alkali earth metals and the cation chloride in analyses that were done as indicated in the table. It is significant to note that after the units have been installed for a short period of time, the data shows very significant reduction in the sodium level which causes a bad taste in the water.

Table II is a test taken at another location with different levels of sodium in a municipal water supply, still indicating significant reductions after an installed period of three months.

Table III is a further indication of another location where tests were made with one or two pre-filters of the type indicated as 12 and 20 in the drawings where a further significant reduction was attained with two pre-filters, only sodium and chloride having been tested.

TABLE I

|  | WATER IN PPM | WATER OUT PPM (after 3 months) | WATER OUT PPM (after 6 months) |
|---|---|---|---|
| Calcium | 16 | 15.5 | 11.0 |
| Magnesium | 4.5 | 5.0 | 3.0 |
| Sodium | 75.0 | 32.5 | 30.0 |

TABLE II

|  | WATER IN PPM | WATER OUT PPM | WATER OUT PPM (after 3 months) |
|---|---|---|---|
| Sodium | 9.5 | 9.0 | 4.4 |
| Chloride | 15.0 | 15.0 | 9.6 |

TABLE III

|  | RAW IN PPM | PPM ONE PREFILTER | PPM TWO PREFILTERS |
|---|---|---|---|
| Sodium | 40.0 | 16.0 | 7.15 |
| Chloride | 75.0 | 32.5 | 23.2 |

I claim:

1. The method of removing salts of the alkali earth metal group from water comprising the steps of supplying water in a one-half inch pipe at 75 p.s.i, pre-filtering the water supply with a first five-micron filter to remove contaminants and reduce the flow rate to 4-5 g.p.m., connecting a second five-micron filter to the effluent of the first filter to reduce the flow rate to 3 g.p.m., passing the effluent through at least twelve parallel connected five-micron filter units the effluent of which is passed through at least twelve parallel connected activated charcoal filters, whereby the flow is reduced to approximately 0.5 g.p.m. to allow additional time for the water to contact the charcoal, whereby alkali earth metal salt is adsorbed.

2. The method as in claim 1 wherein the activated charcoal filter units and preceding five-micron filters are a unitary part and are located in a single container.

* * * * *